United States Patent
Xiao et al.

(10) Patent No.: US 10,903,491 B2
(45) Date of Patent: Jan. 26, 2021

(54) RECHARGEABLE LITHIUM-ION BATTERY CHEMISTRY WITH FAST CHARGE CAPABILITY AND HIGH ENERGY DENSITY

(71) Applicant: GM GLOBAL TECHNOLOGY OPERATIONS LLC, Detroit, MI (US)

(72) Inventors: Xingcheng Xiao, Troy, MI (US); Li Yang, Troy, MI (US); Gayatri V. Dadheech, Bloomfield Hills, MI (US); Gongshin Qi, Troy, MI (US); Mark W. Verbrugge, Troy, MI (US); Sherman H. Zeng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 16/243,969

(22) Filed: Jan. 9, 2019

(65) Prior Publication Data
US 2020/0220172 A1  Jul. 9, 2020

(51) Int. Cl.
*H01M 4/525* (2010.01)
*H01M 10/0525* (2010.01)
(Continued)

(52) U.S. Cl.
CPC ............. *H01M 4/525* (2013.01); *H01M 4/38* (2013.01); *H01M 4/625* (2013.01);
(Continued)

(58) Field of Classification Search
CPC .... H01M 4/38; H01M 4/625; H01M 10/0525; H01M 10/0569; H01M 10/44
(Continued)

(56) References Cited

U.S. PATENT DOCUMENTS 7,261,979 B2 *  8/2007  Gozdz et al. ......... H01M 4/133
                                                    429/231.95
8,309,240 B1 *  11/2012  Li et al. ............ H01M 10/0525
                                                          429/57
(Continued)

OTHER PUBLICATIONS

Cho, Kiho et al., "Phosphorene: An emerging 2D material," *J. Mater. Res.*, vol. 32, No. 15, pp. 2839-2847; DOI: 10.1557/jmr.2017.71 (Published: Aug. 14, 2017).
(Continued)

*Primary Examiner* — Sun J Lin
(74) *Attorney, Agent, or Firm* — Harness, Dickey & Pierce, P.L.C.

(57) ABSTRACT

A rechargeable lithium-ion battery disclosed herein comprises a positive electrode with a positive electroactive material that in a charged state comprises lithium iron (II) orthosilicate ($Li_2FeSiO_4$) and in a discharged state comprises $FeSiO_4$ or $LiFeSiO_4$. A negative electrode comprises phosphorene. A separator is disposed between the positive electrode and the negative electrode. An electrolyte has an organic solvent especially containing ether-based organic solvents and a lithium salt that provides a conductive medium for lithium ions to transfer between the positive electrode and the negative electrode. Such a rechargeable lithium-ion battery provides advantageous power delivery, long driving ranges, and fast charge to enhance widespread use of batteries, especially in vehicles. Furthermore, lithium plating can be minimized or avoided, even at low temperature charging. Methods of recharging a rechargeable lithium-ion battery at low temperatures are also disclosed.

20 Claims, 2 Drawing Sheets

(51) Int. Cl.
  *H01M 4/38* (2006.01)
  *H01M 4/62* (2006.01)
  *H01M 10/0569* (2010.01)
  *H01M 10/44* (2006.01)

(52) U.S. Cl.
  CPC ... *H01M 10/0525* (2013.01); *H01M 10/0569* (2013.01); *H01M 10/44* (2013.01)

(58) Field of Classification Search
  USPC .......................................................... 320/128
  See application file for complete search history.

(56) References Cited

U.S. PATENT DOCUMENTS

| | | | | |
|---|---|---|---|---|
| 9,034,519 | B2* | 5/2015 | Xiao et al. ............. | H01M 4/62 429/223 |
| 9,246,158 | B2* | 1/2016 | Holme et al. ....... | H01M 4/0428 |
| 10,167,196 | B1* | 1/2019 | Shatruk et al. ....... | C01B 25/081 |
| 10,396,360 | B2* | 8/2019 | Xiao et al. ............ | H01M 4/387 |
| 2019/0300383 | A1* | 10/2019 | Ren et al. ........... | H01M 4/0471 |
| 2020/0220154 | A1* | 7/2020 | Xiao et al. .......... | H01M 4/0404 |

OTHER PUBLICATIONS

Gummow, Rosalind June, "Li$_2$MnSiO$_4$ Nanostructured Cathodes for Rechargeable Lithium-Ion Batteries," in Ozoemena K., Chen S. (eds) *Nanomaterials in Advanced Batteries and Supercapacitors; Nanostructure Science and Technology* (Switzerland, Springer, Cham, 2016), pp. 25-54; DOI: 10.1007/978-3-319-26082-2.

Li, Weifeng et al., "Ultrafast and Directional Diffusion of Lithium in Phosphorene for High-Performance Lithium-Ion Battery," *Nano Lett.*, 2015, 15(3), pp. 1691-1697 (Abstract Only).

Kouthaman, Mathiyalagan et al., "Optimization of Lithium Iron Orthosilicate Electrodes Synthesized via Various Methods," *International Research Journal of Engineering and Technology (IRJET)*, 4, 9 (Sep. 2017), pp. 27-30; Presented at: One Day International Seminar on Materials Science & Technology (ISMST 2017), Aug. 4, 2017.

Kumar, Ajay et al., "Improved electrochemical performance of Li$_2$FESiO$_4$/CNF/rGO nanocomposites for lithium ion batteries," *Solid State Ionics*, 325 (2018), pp. 43-47; DOI: 10.1016/j.ssi.2018.07.026 (Published Online: Aug. 1, 2018).

Ni, Jiangfeng et al., "Lithium Iron Orthosilicate Cathode: Progress and Perspectives," *ACS Energy Lett.*, 2017, 2 (8), pp. 1771-1781; DOI: 10.1021/acsenergylett.7b00452 (Published Online: Jul. 7, 2017).

Rajkumar, Palanisamy et al., "Synthesis and Studies on Lithium Iron Orthosilicate Cathode Materials via Modified Sol-Gel Method," Conference Proceedings: International Seminar on Nanoscience and Technology, Sep. 2016, pp. 36-40.

Shen, Shuiyun et al., "Li$_2$FeSiO$_4$/C hollow nanospheres as cathode materials for lithium-ion batteries," *Nano Res.* (2018); DOI 10.1007/s12274-018-2223-5 (Published Online: Nov. 9, 2018) (Abstract Only).

Tian, Meiyue et al., "Tri-phase (1-x-y) Li$_2$FeSiO$_4$—xLiFeBO$_3$—yLiFePO$_4$ nested nanostructure with enhanced Li-storage properties," *Chemical Engineering Journal*, 358 (2019), pp. 786-793; DOI: 10.1016/j.cej.2018.10.059 (Published Online: Oct. 9, 2018).

Wei, Huijing et al., "Ethylenediamine—Enables Sustainable Synthesis of Mesoporous Nanostructured Li$_2$Fe$^{II}$SiO$_4$ Particles from Fe(III) Aqueous Solutions for Ion Battery Application," *ACS Sustainable Chem. Eng.*, 2018, 6, (6), pp. 7458-7457; DOI 10.1021/acssuschemeng.8b00090 (Published Online: Apr. 2, 2018) (Abstract Only).

Zhang, Qingtang et al., "Hierarchical mesoporous Li$_2$FeSiO$_4$/C sheaf-rods as a high-performance lithium-ion battery cathode," *Journal of Alloys and Compounds*, 767 (2018), pp. 195-203; DOI: 10.1016/j.jallcom.2018.07.105 (Published Online: Jul. 11, 2018).

* cited by examiner

RECHARGEABLE LITHIUM-ION BATTERY CHEMISTRY WITH FAST CHARGE CAPABILITY AND HIGH ENERGY DENSITY

INTRODUCTION

This section provides background information related to the present disclosure which is not necessarily prior art.

High-energy density, electrochemical cells, such as lithium-ion batteries can be used in a variety of consumer products and vehicles, such as hybrid or electric vehicles. Battery powered vehicles show promise as a transportation option as technical advances continue to be made in battery power, lifetimes, and cost. One factor potentially limiting wider acceptance and use of battery-powered vehicles is the potentially limited driving range, especially in the earlier stages of adoption where charging stations are not yet ubiquitous as gas stations are today. It would be desirable to provide batteries capable of providing longer drive ranges and shorter charge times. In addition, battery-powered vehicles often are required to operate in extreme weather conditions, for example, at low temperatures in Northern winter weather.

In the face of these requirements, it has been a challenge to find economical battery chemistries that meet both energy and power requirements. There has long been a need for a battery having a chemistry that avoids or minimizes use of expensive metals, such as cobalt and other noble metals, while providing advantageous power delivery, long driving ranges, and fast charge to enhance widespread use of batteries, especially in vehicles.

SUMMARY

This section provides a general summary of the disclosure, and is not a comprehensive disclosure of its full scope or all of its features.

In certain variations, the present disclosure provides a rechargeable lithium-ion battery including a positive electrode including a positive electroactive material that in a charged state includes $Li_2MSiO_4$ and in a discharged state includes $MSiO_4$ or $LiMSiO_4$. M includes a metal selected from the group consisting of: iron (Fe), aluminum (Al), manganese (Mn), magnesium (Mg), and combinations thereof. The battery also includes a negative electrode including phosphorene. A separator is disposed between the positive electrode and the negative electrode. An electrolyte including an organic solvent and a lithium salt is also included in the battery that provides a conductive medium for lithium ions to transfer between the positive electrode and the negative electrode.

In certain aspects, the metal is a first metal so that M includes the first metal (MI) and further includes a second metal (MII) dopant selected from the group consisting of: zirconium (Zr), hafnium (Hf), titanium (Ti), and combinations thereof.

In certain further aspects, $M=MI_x+MII_y$, where x is greater than or equal to about 0.75 and y is less than or equal to about 0.25.

In certain aspects, the negative electrode further includes a conductive carbon particle mixed with the phosphorene.

In certain aspects, the organic solvent includes an organic ether compound selected from the group consisting of: tetrahydrofuran, 2-methyl tetrahydrofuran, dioxolane, glyme (dimethoxy ethane (DME)), diglyme (diethylene glycol dimethyl ether), triglyme (tri(ethylene glycol) dimethyl ether), 1,3-dimethoxypropane (DMP), and combinations thereof.

In certain aspects, the positive electrode is free of cobalt and free of nickel.

In certain aspects, an energy density of the battery is greater than or equal to about 250 Wh/kg and greater than or equal to about 600 Wh/L.

In certain aspects, an energy density of the battery is greater than or equal to about 350 Wh/kg and greater than or equal to about 900 Wh/L.

In certain aspects, the battery has an areal capacity of at least 3.7 $mAh/cm^2$ and can be charged to 90% of its full capacity within 10 minutes of charging.

In certain aspects, the battery is capable of a charge rate of greater than or equal to about 4 C at 25° C.

In certain aspects, a rechargeable lithium ion battery stack includes a plurality of rechargeable lithium-ion batteries as described in any of the variations above.

In certain other variations, a rechargeable lithium-ion battery is provided that includes a positive electrode including a positive electroactive material that in a charged state includes lithium iron (II) orthosilicate ($Li_2FeSiO_4$) and in a discharged state includes $FeSiO_4$ or $LiFeSiO_4$. A negative electrode includes phosphorene. The batter also includes a separator disposed between the positive electrode and the negative electrode. An electrolyte including an organic solvent and a lithium salt that provides a conductive medium for lithium ions to transfer between the positive electrode and the negative electrode is also provided.

In certain aspects, the positive electroactive material further including a second metal dopant selected from the group consisting of: zirconium (Zr), hafnium (Hf), titanium (Ti), and combinations thereof. The second metal dopant is present at less than or equal to about 25% by mass of the positive electroactive material.

In certain further variations, a method of recharging a rechargeable lithium-ion battery includes charging a rechargeable lithium-ion battery at a temperature less than or equal to about 0° C. by connecting a rechargeable lithium-ion battery to a power source. The rechargeable lithium-ion battery includes a positive electrode including a positive electroactive material that transforms a discharged state to a charged state during the charging, wherein the positive electroactive material includes $FeSiO_4$ or $LiFeSiO_4$ in the discharged state and lithium iron (II) orthosilicate ($Li_2FeSiO_4$) in the charged state. The battery also includes a negative electrode including phosphorene. A separator is disposed between the positive electrode and the negative electrode. The battery further includes an electrolyte including an organic solvent and a lithium salt that provides a conductive medium for lithium ions to transfer between the positive electrode and the negative electrode.

In certain aspects, the charging occurs at a temperature of less than or equal to about −20° C.

In certain further aspects, the charging occurs at a temperature of less than or equal to about −40° C.

In certain aspects, the solvent is selected from the group consisting of: tetrahydrofuran, 2-methyl tetrahydrofuran, dioxolane, glyme (dimethoxy ethane (DME)), diglyme (diethylene glycol dimethyl ether), triglyme (tri(ethylene glycol) dimethyl ether), 1,3-dimethoxypropane (DMP), and combinations thereof.

In certain aspects, the positive electrode is free of cobalt and free of nickel.

In certain aspects, the method further includes discharging the rechargeable lithium-ion battery that transforms the positive electrode from the charged state to the discharged state. The negative electrode is substantially free of lithium plating after the charging and discharging.

In certain aspects, the positive electroactive material further including a second metal dopant selected from the group consisting of: zirconium (Zr), hafnium (Hf), titanium (Ti), and combinations thereof. The second metal dopant is present at less than or equal to about 25% by mass of the positive electroactive material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
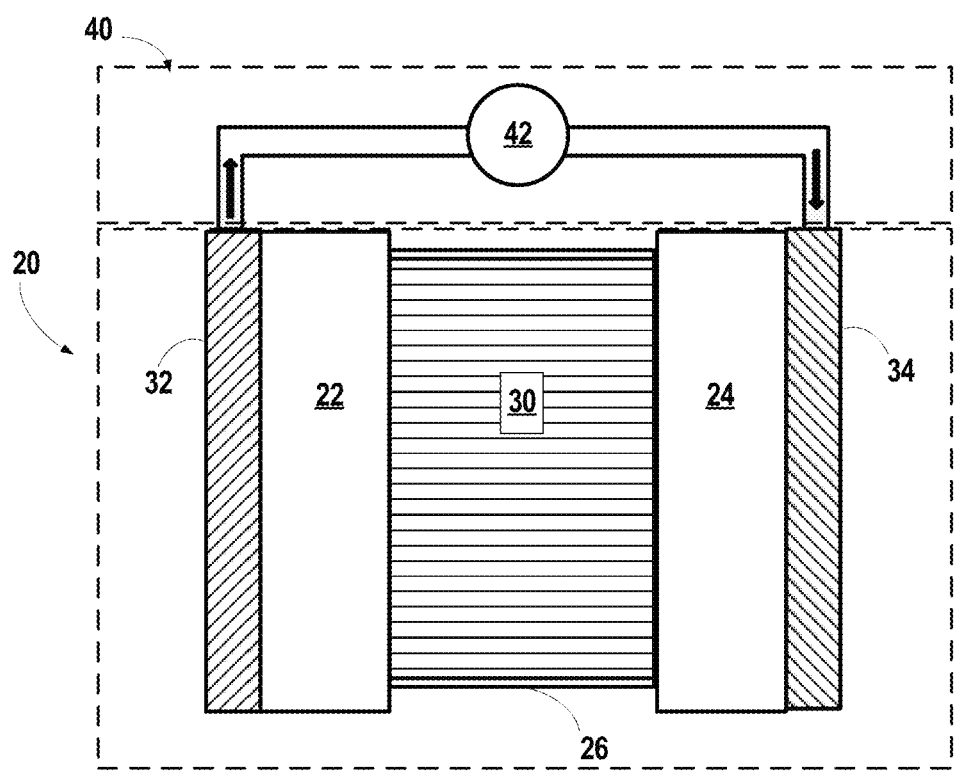
FIG. 1 is a schematic of an exemplary electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to lithium-ion electrochemical cells that may be incorporated into energy storage devices like rechargeable lithium-ion batteries, which may be used in vehicle applications. However, the present technology may also be used in other electrochemical devices that cycle lithium ions. A rechargeable lithium-ion battery is provided that may exhibit both high energy capacity and high power capacity for fast charging.

Typical lithium-ion batteries comprise a first electrode, such as a positive electrode or cathode, a second electrode such as a negative electrode or an anode, an electrolyte material, and a separator. Often a stack of lithium-ion battery cells are electrically connected in an electrochemical device to increase overall output. Lithium-ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

The negative electrode may include a lithium insertion material or an alloy host material. For hybrid and electric vehicles, the most common electroactive material for forming a negative electrode/anode is graphite that serves as a lithium-graphite intercalation compound. Graphite is the commonly used negative electrode material because of its desirably high specific capacity (approximately 350 mAh/g).

However, when using graphite as a negative electrode in a lithium-ion battery, lithium plating can occur during fast charging of lithium ion batteries, for example, when the potential at the negative electrode is close to 0 V versus a lithium metal reference (a potential versus Li/Li+). Lithium plating can cause loss of performance in the negative electrode and is believed to occur when lithium ions deposit as metallic lithium on a surface of the electrode, rather than intercalating into or distributing within the electroactive material within the electrode. This phenomenon can occur with graphite negative electrodes under various conditions, including fast charging processes (where graphite operates at a lower potential and hence can experience voltages near 0 V) or during cold temperature charging. As discussed above, it would be desirable to have a negative electrode that can exhibit both high energy/high specific capacity and as well as high power/fast charging capacity, especially for plug-in hybrid and electric vehicle applications where rapid charging at charging stations may be desirable.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. While not shown, the negative electrode current collector and the positive electrode current collector may be coated on one or both sides, as is known in the art. In certain aspects, the current collectors may be coated with an active material/electrode layer on both sides. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being disposed between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of cyclable lithium. The chemical potential difference between the positive electrode 24 and the negative electrode 22 drives electrons produced by the oxidation of lithium (e.g., intercalated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to form intercalated or alloyed lithium at the positive electrode 24. The electric current passing through the external circuit 40 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the otherwise non-spontaneous oxidation of lithium (e.g., intercalated lithium) at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical series and/or parallel arrangement to provide a suitable electrical energy and power package.

Furthermore, the lithium-ion battery 20 can include a variety of other components that while not depicted here are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

With renewed reference to FIG. 1, any appropriate electrolyte 30, whether in solid form or solution, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. Appropriate lithium salts generally have inert anions. A non-limiting list of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis(trifluoromethanesulfonimide) (LITFSI) ($LiN(CF_3SO_2)_2$); lithium fluorosulfonylimide ($LiN(FSO_2)_2$) (LIFSI); and combinations thereof. In certain variations, the lithium salt is selected from $LiPF_6$, LiFSI, LiTFSI, and combinations thereof. An electrolyte may comprise a 1 M concentration of the lithium salts. In some embodiments, conventional electrolyte compositions can be used, such as a 1 molar solution of $LiPF_6$ in an organic solvent.

These lithium salts may be dissolved in a variety of organic solvents. In certain aspects, of the present teachings, the organic solvent is selected to be an organic ether compound. By way of example, ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof.

Carbonate-based solvents may include various alkyl carbonates, such as cyclic carbonates (e.g., ethylene carbonate, propylene carbonate, butylene carbonate) and acyclic carbonates (e.g., dimethyl carbonate, diethyl carbonate, ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane);

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Separator

The porous separator 26 may include, in instances, a microporous polymeric separator including a polyolefin (including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Positive Electrode

The positive electrode 24 may be formed from a lithium-based active material that can sufficiently undergo lithium intercalation and deintercalation or alloying and dealloying, while functioning as the positive terminal of the lithium-ion battery 20. The positive electrode 24 can comprise a binder to contribute to the integrity of the electrode. The positive electrode can further comprise electrically conductive particles, such as graphite particles, graphite or carbon fibers, carbon fibrils, carbon whiskers, carbon black, silver particles or the like to improve electrical conduction in the electrode.

The negative electroactive material may comprise $Li_2MSiO_4$, where M is selected from the group consisting of: iron (Fe), aluminum (Al), manganese (Mn), magnesium (Mg), and combinations thereof. In certain variations, M comprises at least iron (Fe). In certain aspects, the metal centers (M) may include M as described above with primary metal MI, but may be doped with a second dopant metal MII. The dopant metal MII may be selected from metals in Group 4 of the IUPAC Periodic Table, such as zirconium (Zr), hafnium (Hf), titanium (Ti), and combinations thereof. In certain aspects, a concentration of the dopant metal is at or below about 25% of the total amount of metal (M), so that $M=MI_x+MII_y$, where x is greater than or equal to about 0.75 and y is less than or equal to about 0.25.

In certain variations, the positive electrode comprises an electroactive material comprising lithium iron (II) orthosilicate ($Li_2FeSiO_4$) in a charged state, while the electroactive material loses one to two lithium ions in a discharged state to result in $LiFeSiO_4$ or $FeSiO_4$. Advantageously, the positive electroactive material may be free of cobalt (Co) and nickel (Ni). In certain aspects, the positive electroactive material comprising lithium iron (II) orthosilicate ($Li_2FeSiO_4$) may further comprise a second metal dopant selected from the group consisting of: zirconium (Zr), hafnium (Hf), titanium (Ti), and combinations thereof. As noted above, the second metal dopant may be present at less than or equal to about 25% by mass of the positive electroactive material. Such dopant metals may thus form metal silicates.

The rechargeable cell can also have a positive electrode that further comprises microcarbon or nanocarbon. In certain aspects, the positive electrode may have the electroactive material along with a conductive carbon particle that may be a microcarbon or nanocarbon material. By microcarbon or nanocarbon, it is meant that electrically conductive particles comprising carbon are present in the positive electrode. The conductive particles may have an average particle size diameter within the microscale or nanoscale range. The silicate particles can be synthesized by co-precipitation or solid-state reaction. Similar as a conventional electrode fabrication process, the silicate particles can be mixed with polymer binder (such as PVDF), conductive additives (such as carbon black) with organic solvent (such as NMP) to make slurry and cast on the current collectors.

A "microparticle" as used herein encompasses "nanoparticles," as discussed below. In certain variations of the present teachings, a microparticle component has at least one spatial dimension that is less than about 1,000 µm (i.e., 1 mm). The term "micro-sized" or "micrometer-sized" as used herein is generally understood by those of skill in the art to mean less than about 500 µm (i.e., 0.5 mm), optionally less than or equal to about 100 µm (i.e., 0.1 mm), optionally less than about 10 µm (i.e., 10,000 nm), optionally less than about 5 µm (i.e., 5,000 nm), and optionally less than about 1 µm (i.e., 1,000 nm).

"Nano-sized" or "nanometer-sized" particles have at least one spatial dimension that is less than about 1 µm (i.e., 1,000 nm), optionally less than about 0.5 µm (i.e., 500 nm), optionally less than about 0.4 µm (i.e., 400 nm), optionally less than about 0.3 µm (i.e., 300 nm), optionally less than about 0.2 µm (i.e., 200 nm), and in certain variations, optionally less than about 0.1 µm (i.e., 100 nm). Accordingly, a nanoparticle component has at least one spatial dimension that is greater than about 1 nm and less than about 1,000 nm (1 µm).

The positive electrode 24 may include a polymeric binder material to fortify structurally the lithium-based active material. The positive electrode 24 electroactive materials may further include compounds that include one or more transition metals, such as manganese (Mn), nickel (Ni), cobalt (Co), chromium (Cr), iron (Fe), vanadium (V), and combinations thereof. However, in certain variations, the positive electrode 24 is free of select metals, such as nickel (Ni) and cobalt (Co).

Such electroactive materials may be intermingled with an optional electrically conductive material (e.g., particles) and at least one polymeric binder, for example, by slurry casting active materials and optional conductive material particles with such binders, like polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, and combinations thereof.

Electrically conductive materials may include graphite, other carbon-based materials, conductive metals or conductive polymer particles. Carbon-based materials may include by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used. The positive current collector 34 may be formed from aluminum or any other appropriate electrically conductive material known to those of skill in the art. As noted above, the positive current collector 34 may be coated on one or more sides.

Negative Electrode

In various aspects, the negative electrode 22 includes an electroactive material as a lithium host material capable of functioning as a negative terminal of a lithium-ion battery. The nature of the negative electrode intercalation material influences the resulting voltage of the battery since the voltage is the difference between the half-cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<<x\leq1$ or $Li_{1+x}Ti_{2-x}O_4$, $0\leq x\leq\frac{1}{3}$. As discussed above, synthetic graphite has been employed as a negative electrode active material, but can be prone to undesirable lithium plating under certain conditions, such as under fast charge (charge rate >3 C). Silicon is also a promising negative electroactive material, but its low cycle efficiency, propensity for volumetric expansion and contraction during lithiation and delithiation, and short life remain as challenges to its widespread use.

Therefore, in accordance with certain aspects of the present disclosure, a negative electrode comprises an electroactive material comprising phosphorus. In certain variations, the electroactive material comprises phosphorene. Phosphorene can be viewed as a single layer of black phosphorus, much in the same way that graphene is a single layer of graphite. Phosphorene has a theoretical current density of about 2600 mAh/g and an average voltage of about 0.8 V. The high intercalation capacity (to provide high energy density) and high voltage of a phosphorene anode (to avoid Li plating) is believed to contribute to the advantageous properties of the batteries.

The negative electrodes described herein can be incorporated into various commercial battery cell designs. While the negative electrode can be used in batteries for primary, or single charge use, the resulting batteries generally have desirable cycling properties for secondary battery use over multiple cycling of the cells. The battery cells can comprise a single negative electrode structure or a plurality of negative electrode structures assembled in parallel and/or series electrical connection(s). For example, the electrodes described herein can be stacked with the separator between them, and the resulting stacked structure can be rolled into a cylindrical, prismatic, or other reasonable configuration to form the battery structure. Appropriate electrically conductive tabs can be welded or the like to the current collectors, and the resulting jellyroll or stacked structure can be placed into a metal canister or polymer package, which can be flexible, with the negative tab and positive tab welded to appropriate external contacts. Electrolyte is added to the canister or package, and the canister or package is sealed to complete the battery.

In certain variations, where the negative electrode 22 comprises phosphorene. In other variations, the negative electrode 22 may include the electroactive lithium host material, e.g., phosphorene, and optionally another electrically conductive material, as well as one or more polymeric binder materials to structurally hold the lithium host material together. In certain variations, the negative electrode includes a conductive carbon particle, such as a microcarbon or nanocarbon material, mixed with the phosphorene. The negative electroactive material and the electrically conductive particles may be intermingled with a binder material selected from the group consisting of: polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable electrically conductive particles may include a material selected from carbon-based materials, conductive metals, conductive polymers, and combinations thereof, including microparticles and nanoparticles comprising carbon. Carbon-based materials may include by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of conductive particle materials may be used.

In certain alternative embodiments, the negative electrode 22 may further include a negative electroactive material including carbon-containing compounds, like graphite, silicon (Si), titanium (Ti), tin (Sn), or other negative electrode particles.

Electrode Construction

The positive electrode active compositions generally are powder compositions that are held together in the corresponding electrode with a polymer binder. The binder provides ionic conductivity to the active particles when in contact with the electrolyte. Suitable polymer binders were described above and include, for example, polyvinylidene fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The positive electrode active material loading in the binder can be large, such as greater than about 80 weight percent. For example, the binder can be present at a level of greater than or equal to about 1 to less than or equal to about 20% by weight, or more narrowly greater than or equal to about 1 to less than or equal to about 10%, greater than or equal to about 1 to less than or equal to about 8%, greater than or equal to about 1 to less than or equal to about 5%, greater than or equal to about 1 to less than or equal to about 7%, greater than or equal to about 1 to less than or equal to about 5%, and optionally greater than or equal to about 1 to less than or equal to about 3% by weight binder. To form the electrode, the powders can be blended with the polymer in a suitable liquid, such as a solvent for the polymer. The resulting paste can be pressed into the electrode structure.

The positive electrode composition generally also comprises an electrically conductive powder distinct from the electroactive composition, as discussed above. While the metal alloy/intermetallic compositions described herein generally provide for electrical conductivity within the negative electrode structure, the negative electrode can optionally further comprise supplemental electrically conductive powders, such as the conductive powders above. In some embodiments, the negative electrode comprises less than or equal to about 15 weight % supplemental electrically conductive powders, in other embodiments less than or equal to about 10 weight %, and in additional embodiments from greater than or equal to about 0.5 to less than or equal to about 8 weight percent supplemental electrically conductive powders. While the supplemental electrically conductive compositions are described as powders, these materials lose their powder character following incorporation into the electrode where the associated particles of the supplemental electrically conductive material become a component of the resulting electrode structure.

Current Collectors

The positive electrode and negative electrodes generally are associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, titanium or the like. The electrode material can be cast in contact with the current collector.

For example, in some embodiments, the electrode material in contact with the current collector foil or other structure can be subjected to a pressure from about 2 to about 10 kg/cm$^2$. The pressed structure can be dried, for example in an oven, to remove the solvent from the electrode. Metal foils can be used as current collectors. For example, copper foils can be used as current collectors for negative electrodes and aluminum foil can be used as positive electrode current collectors. Pastes or slurries of the active materials can be coated onto both sides of the foil. In alternative variations, a film or layer of the active material may be coated onto the current collector. Then, the electrodes can be pressed using calendaring rolls, a press with a die or other suitable processing apparatus to compress the electrodes to a desired thickness. The positive electrodes can have an active material particle loading on each side of the current collector from 20 mg/cm$^2$ to 50 mg/cm mg/cm$^2$. The positive electrodes can have a density of at least 2.5 grains per milliliter (g/mL), in further embodiments at least about 2.8 g/ml and in additional embodiments from about 3.0 g/mL to about 3.5 g/mL. A person of ordinary skill in the art will recognize that additional ranges of active material loading within the explicit range above are contemplated and are within the present disclosure.

In some embodiments, the negative electrodes can be similarly prepared with respect to contact of the electrode composition with the current collector as well as drying and pressing the resulting structure.

Cell Designs

The electrodes described herein can be incorporated into various commercial cell designs. For example, the cathode compositions can be used for prismatic shaped cells, wound cylindrical cells, coin cells, pouch cells or other reasonable cell shapes. The cells can comprise a single electrode structure of each polarity or a stacked structure with a plurality of positive electrodes and negative electrodes assembled in parallel and/or series electrical connection(s). In particular, the battery can comprise a stack of alternating positive electrodes and negative electrodes with separators between them. Generally, the plurality of electrodes is connected in parallel to increase the current at the voltage established by a pair of a positive electrode and a negative electrode. While the positive electrode active materials can be used in batteries for primary, or single charge use, the resulting batteries generally have desirable cycling properties for secondary battery use over multiple cycling of the cells.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister or package is sealed to complete the battery.

Lithium Ion Batteries

The batteries described herein generally are lithium ion batteries in which generally a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation, alloying, or the like during discharge such that the positive electrode functions as a cathode, which neutralizes the lithium ions with the consumption of electrons. Upon recharging of the secondary cell, the flow of lithium ions is reversed through the cell, with the negative electrode taking up lithium and with the positive electrode releasing lithium as lithium ions.

A battery may have a laminated cell structure, comprising an anode or negative electrode layer 22, a cathode or positive electrode layer 24, and electrolyte/separator 26, 30 between the negative electrode 22 and the positive electrode 24 layers. The negative electrode 22 and the positive electrode 24 layers each comprise a current collector (negative current collector 32 and positive current collector 34). A negative anode current collector 32 may be a copper collector foil, which may be in the form of an open mesh grid or a thin film. The current collectors can be connected to an external current collector tab. The negative and positive current collectors 32, 34 may be coated with cathode and anode layers respectively on both sides (double-sided coating).

Fast Charging Batteries

In various aspects, the novel battery/cell chemistry described herein can economically offer high energy density, fast charge capability, and minimal or no lithium (Li) plating.

It is believed that certain embodiments of the present disclosure provide a synergy of electrode active materials (e.g., $Li_2FeSiO_4$ and phosphorene) and the electrolyte, especially the electrolyte solvent (e.g., ether-based organic solvent), which is responsible for the unexpected advantages seen in cells and batteries incorporating the electrodes and electrolyte in accordance with various aspects of the present disclosure. The lower cell voltage during operation enables wider electrolyte options (including ether-based electrolytes) for low temperature performance (less than or equal to about −40° C.) and fast charge rates.

For the anode (i.e., the negative electrode, which is the anode on discharge), in certain aspects, phosphorene is incorporated into the electrode as an intercalation material. It exhibits a current density of about 2600 mAh/g, and has average voltage 0.8 V. Because of the high voltage, the common problem of lithium plating is minimized or avoided. In certain variations, after cycling lithium ions during charging and discharging cycles, the negative electrode may be substantially free of lithium plating meaning that the detrimental effects associated with lithium plating, such as significant capacity loss, are avoided. In addition, the production of a solid electrolyte interphase (SEI) is minimized. This negative electrode incorporating phosphorene enables an ultrafast charge, and is less expensive in use than certain other intercalation materials.

In certain aspects, the cathode (i.e., the positive electrode that is the cathode on discharge) contains $Li_2MSiO_4$ as an active material, where M contains at least iron (Fe).

As to electrolyte, the lower cell voltage enables wider electrolyte options for low temperature performance (<−40° C.) and fast charge. In particular, the cell chemistry enables the use of ether compounds in the electrolyte. These tend to have lower viscosities, allowing battery/cell to function at temperatures of less than or equal to about −20° C. or even less than or equal to about −40° C.

Advantageously, the new battery chemistry in accordance with certain aspects of the present disclosure provides a battery with a high energy density for an extended driving range. In certain variations, the battery has an energy density of greater than or equal to about 250 Wh/kg and optionally of greater than or equal to about 350 Wh/kg. In other variations, the battery has an energy density of greater than or equal to about 600 Wh/L and optionally greater than or equal to about 900 Wh/L. This represents as much as a 50% increase compared to current batteries. By combining high energy density (for long range) and power density (for fast charge), it is possible with the new chemistry to drive 400 miles within 10 minutes charge time.

The lithium iron (II) orthosilicate ($Li_2FeSiO_4$) can be made by a wet-chemistry process (such as co-precipitation, microwave hydrothermal/solvothermal process, sol-gel, and the like) or a solid-state reaction. The phosphorene in the negative electrode can be synthesized by high speed ball milling or high pressure to convert red phosphorus to black phosphorus (phosphorene).

The rechargeable lithium-ion battery cell provided by certain aspects of the present disclosure is also fast charging. When the cell has an areal capacity of at least 3.7 mAh/cm$^2$ it can be charged to 90% of its full capacity within 10 minutes of charging.

In this manner, a rechargeable lithium ion electrochemical cell prepared in accordance with certain aspects of the present disclosure is capable of charging at a rate of greater than or equal to about 4 C at 25° C., where a 1 C rate would charge the electrode from zero state of charge to 100% state of charge in one hour. In other words, a rechargeable lithium-ion battery is contemplated that achieves both fast charge capability and high energy density, where high power capacity electroactive material, like phosphorene, serves as the carrier for fast charging, while high energy capacity electroactive material, like $Li_2FeSiO_4$, serves as the carrier for high energy density.

The current teachings also provide a rechargeable lithium ion battery comprising a plurality of rechargeable cells described herein. In certain embodiments, the rechargeable lithium ion battery according to the present disclosure is capable of being charged from 0% to 80% state of charge (SOC) in less than or equal to about 15 minutes. In one example, a rechargeable lithium ion battery prepared in accordance with certain aspects of the present teachings can be charged within 10 minutes to store energy for travelling 400 miles in a vehicle weighing over 3,500 pounds.

The present disclosure also contemplates a method of recharging a rechargeable lithium-ion battery at low temperatures. In certain aspects, the method includes charging a rechargeable lithium-ion battery at a temperature less than or equal to about 0° C. by connecting a rechargeable lithium-ion battery to a power source. The rechargeable lithium-ion battery comprises a positive electrode comprising a positive electroactive material that transforms a discharged state to a charged state during the charging, wherein the positive electroactive material comprises $FeSiO_4$ or $LiFeSiO_4$ in the discharged state and lithium iron (II) orthosilicate ($Li_2FeSiO_4$) in the charged state. The lithium-ion battery also comprises a negative electrode comprising phosphorene, a separator disposed between the positive electrode and the negative electrode, and an electrolyte comprising an organic solvent and a lithium salt that provides a conductive medium for lithium ions to transfer between the positive electrode and the negative electrode during the charging process. The method may also include discharging of the lithium-ion rechargeable battery, for example, by connecting the lithium-ion rechargeable battery to an external load, where the positive electroactive material transforms from the charged state back to the discharged state during the discharging process. This process may be repeated during multiple cycles.

In certain aspects, the negative electrode is substantially free of lithium plating, as discussed above.

In certain aspects, the charging occurs at a temperature of less than or equal to about −20° C. and optionally at a temperature of less than or equal to about −40° C., because the battery cell enables use of low viscosity ether solvents in the electrolyte. Thus, the composition of the electrolyte may be any of those described previously above, for example, the organic solvent may comprise dimethyl ether, glyme, diglyme, or combinations thereof. In certain aspects, the positive electrode is free of cobalt and free of nickel.

Further description of various aspects of lithium ion batteries for use with these teachings follows.

EXAMPLES

Figure 2:
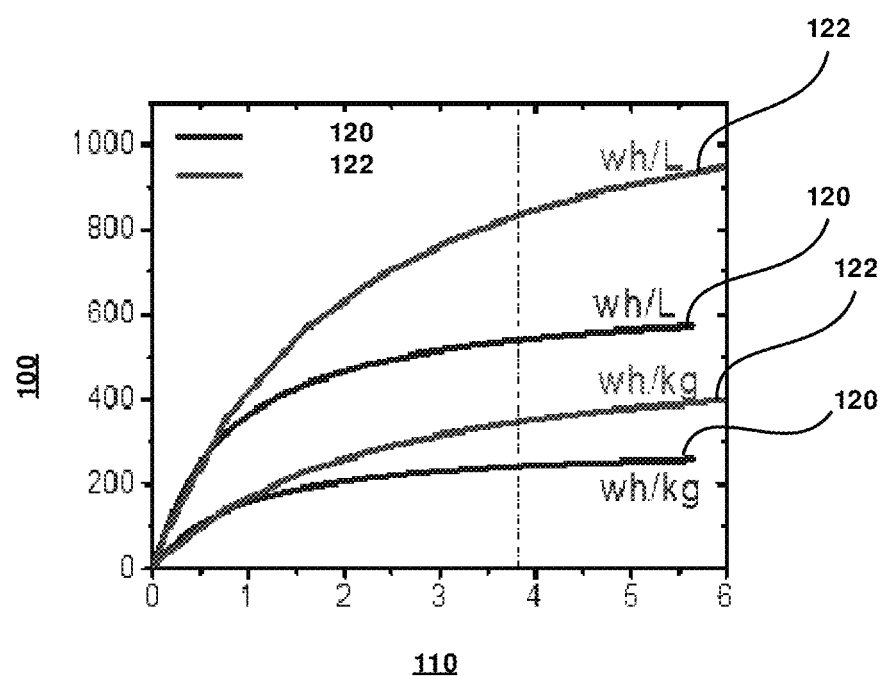
FIG. 2 is a graph of energy density versus areal capacity (mAh/cm$^2$) comparing an existing commercial rechargeable lithium-ion battery with a rechargeable lithium-ion battery prepared in accordance with certain aspects of the present disclosure.

FIG. 2 is a graph of energy density (y-axis labeled 100) versus areal capacity (mAh/cm$^2$) (x-axis labeled 110) comparing calculations of predicted performance of a comparative example of an existing commercial rechargeable lithium-ion battery (labeled 120) having a positive electrode with a nickel metal cobalt active material (NMC—nickel-manganese-cobalt oxide ($LiNiMnCoO_2$)) and a graphite negative electrode. A rechargeable lithium-ion battery (labeled 122) prepared in accordance with certain aspects of the present disclosure has a positive electrode with lithium iron (II) orthosilicate ($Li_2FeSiO_4$) in a charged state and a negative electrode with phosphorene. The positive electrode in the example rechargeable lithium-ion battery 122 does not contain expensive elements, such as cobalt or nickel. As can be seen, the energy density of the example cell 122 prepared in accordance with certain aspects of the present disclosure has a higher energy density (both in Wh/L and Wh/kg) than the comparative cell 120 per areal capacity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rechargeable lithium-ion battery comprising:
a positive electrode comprising a positive electroactive material that in a charged state comprises $Li_2MSiO_4$ and in a discharged state comprises $MSiO_4$ or $LiMSiO_4$, where M comprises a metal selected from a group consisting of: iron (Fe), aluminum (Al), manganese (Mn), magnesium (Mg), and combinations thereof;
a negative electrode comprising phosphorene;
a separator disposed between the positive electrode and the negative electrode; and
an electrolyte comprising an organic solvent and a lithium salt, the electrolyte provides a conductive medium for lithium ions to transfer between the positive electrode and the negative electrode.

2. The rechargeable lithium-ion battery of claim 1, wherein the metal is a first metal so that M comprises the first metal (MI) and further comprises a second metal (MII) dopant selected from a group consisting of: zirconium (Zr), hafnium (Hf), titanium (Ti), and combinations thereof.

3. The rechargeable lithium-ion battery of claim 2, wherein $M=MI_x+MII_y$, where x is greater than or equal to about 0.75 and y is less than or equal to about 0.25.

4. The rechargeable lithium-ion battery of claim 1, wherein the negative electrode further comprises a conductive carbon particle mixed with the phosphorene.

5. The rechargeable lithium-ion battery of claim 1, wherein the organic solvent comprises an organic ether compound selected from a group consisting of: tetrahydrofuran, 2-methyl tetrahydrofuran, dioxolane, glyme (dimethoxy ethane (DME)), diglyme (diethylene glycol dimethyl ether), triglyme (tri(ethylene glycol) dimethyl ether), 1,3-dimethoxypropane (DMP), and combinations thereof.

6. The rechargeable lithium-ion battery of claim 1, wherein the positive electrode is free of cobalt and free of nickel.

7. The rechargeable lithium-ion battery of claim 1 having an energy density of greater than or equal to about 250 Wh/kg and greater than or equal to about 600 Wh/L.

8. The rechargeable lithium-ion battery of claim 1 having an energy density of greater than or equal to about 350 Wh/kg and greater than or equal to about 900 Wh/L.

9. The rechargeable lithium-ion battery of claim 1 having an areal capacity of at least 3.7 $mAh/cm^2$ and can be charged to 90% of its full capacity within 10 minutes of charging.

10. The rechargeable lithium-ion battery of claim 1 that is capable of a charge rate of greater than or equal to about 4 C at 25° C.

11. A rechargeable lithium ion battery stack comprising a plurality of rechargeable lithium-ion batteries of claim 1.

12. A rechargeable lithium-ion battery comprising:
a positive electrode comprising a positive electroactive material that in a charged state comprises lithium iron (II) orthosilicate ($Li_2FeSiO_4$) and in a discharged state comprises $FeSiO_4$ or $LiFeSiO_4$;
a negative electrode comprising phosphorene;
a separator disposed between the positive electrode and the negative electrode; and
an electrolyte comprising an organic solvent and a lithium salt, the electrolyte provides a conductive medium for lithium ions to transfer between the positive electrode and the negative electrode.

13. The rechargeable lithium-ion battery of claim 12, wherein the positive electroactive material further comprising a second metal dopant selected from a group consisting of: zirconium (Zr), hafnium (Hf), titanium (Ti), and combinations thereof, the second metal dopant being present at less than or equal to about 25% by mass of the positive electroactive material.

14. A method of recharging a rechargeable lithium-ion battery comprising:
charging the rechargeable lithium-ion battery at a temperature less than or equal to about 0° C. by connecting a rechargeable lithium-ion battery to a power source, wherein the rechargeable lithium-ion battery comprises:
a positive electrode comprising a positive electroactive material that transforms a discharged state to a charged state during the charging, wherein the positive electroactive material comprises $FeSiO_4$ or $LiFeSiO_4$ in the discharged state and lithium iron (II) orthosilicate ($Li_2FeSiO_4$) in the charged state;
a negative electrode comprising phosphorene;
a separator disposed between the positive electrode and the negative electrode; and
an electrolyte comprising an organic solvent and a lithium salt, the electrolyte provides a conductive medium for lithium ions to transfer between the positive electrode and the negative electrode.

15. The method of claim 14, wherein the charging occurs at a temperature of less than or equal to about −20° C.

16. The method of claim 14, wherein the charging occurs at a temperature of less than or equal to about −40° C.

17. The method according to claim 14, wherein the organic solvent is selected from a group consisting of: tetrahydrofuran, 2-methyl tetrahydrofuran, dioxolane, glyme (dimethoxy ethane (DME)), diglyme (diethylene glycol dimethyl ether), triglyme (tri(ethylene glycol) dimethyl ether), 1,3-dimethoxypropane (DMP), and combinations thereof.

18. The method of claim 14, wherein the positive electrode is free of cobalt and free of nickel.

19. The method according to claim 14, further comprising discharging the rechargeable lithium-ion battery that transforms the positive electrode from the charged state to the discharged state, wherein the negative electrode is substantially free of lithium plating after the charging and the discharging.

20. The method according to claim 14, wherein the positive electroactive material further comprising a second metal dopant selected from a group consisting of: zirconium (Zr), hafnium (Hf), titanium (Ti), and combinations thereof, the second metal dopant being present at less than or equal to about 25% by mass of the positive electroactive material.

* * * * *